United States Patent
Kardos et al.

(10) Patent No.: US 11,199,125 B2
(45) Date of Patent: Dec. 14, 2021

(54) COOLING SYSTEM COMPRISING AT LEAST TWO COOLING CIRCUITS CONNECTED TO A COMMON EXPANSION TANK

(71) Applicant: Scania CV AB, Södertälje (SE)

(72) Inventors: Zoltan Kardos, Södertälje (SE); Ola Hall, Stockholm (SE)

(73) Assignee: Scania CV AB, Södertälje (SE)

(*) Notice: Subject to any disclaimer, the term of this patent is extended or adjusted under 35 U.S.C. 154(b) by 0 days.

(21) Appl. No.: 17/045,641

(22) PCT Filed: Apr. 17, 2018

(86) PCT No.: PCT/SE2018/050387
§ 371 (c)(1),
(2) Date: Oct. 6, 2020

(87) PCT Pub. No.: WO2019/203701
PCT Pub. Date: Oct. 24, 2019

(65) Prior Publication Data
US 2021/0156297 A1 May 27, 2021

(51) Int. Cl.
*F01P 11/02* (2006.01)
*F01P 7/16* (2006.01)
(Continued)

(52) U.S. Cl.
CPC ............... *F01P 7/165* (2013.01); *F01P 3/20* (2013.01); *F01P 11/028* (2013.01);
(Continued)

(58) Field of Classification Search
CPC .. F01P 7/165; F01P 3/20; F01P 11/029; F01P 2005/105; F01P 2007/146; F01P 2050/24;
(Continued)

(56) References Cited

U.S. PATENT DOCUMENTS

2003/0029167 A1  2/2003  Hudson et al.
2003/0221638 A1  12/2003  Haase
(Continued)

FOREIGN PATENT DOCUMENTS

DE  102013226420 A1 *  6/2015  ........... F16K 24/042
DE  102013226420 A1    6/2015
(Continued)

OTHER PUBLICATIONS

Scania CV AB, International Application No. PCT/SE2018/050387, International Preliminary Report on Patentability, dated Oct. 20, 2020.
(Continued)

*Primary Examiner* — Jacob M Amick
(74) *Attorney, Agent, or Firm* — Moore & Van Allen PLLC; W. Kevin Ransom

(57) ABSTRACT

The present invention relates to a cooling system comprising a first cooling circuit cooling a first object, a second cooling circuit cooling a second object, an expansion tank, a first deaeration line directing coolant and air from the first cooling circuit to the expansion tank, and a second deaeration line directing coolant and air from the second cooling circuit to the expansion tank. The cooling system comprises further a deaeration valve configured to control the flow through the first deaeration line, a single expansion tank outlet line configured to direct all coolant in the expansion tank to the second cooling circuit and a connection line configured to direct coolant from the second cooling circuit to the first cooling circuit.

18 Claims, 3 Drawing Sheets

(51) Int. Cl.
*F01P 3/20* (2006.01)
*B60K 1/00* (2006.01)
*F01P 5/10* (2006.01)
*F01P 7/14* (2006.01)

(52) U.S. Cl.
CPC ....... *B60K 2001/003* (2013.01); *F01P 11/029* (2013.01); *F01P 2005/105* (2013.01); *F01P 2007/146* (2013.01); *F01P 2050/24* (2013.01)

(58) Field of Classification Search
CPC .. F01P 11/02; F01P 2011/0233; F01P 11/028; F01P 11/0285; B60K 2001/003
See application file for complete search history.

(56) References Cited

U.S. PATENT DOCUMENTS

| | | | |
|---|---|---|---|
| 2015/0308326 A1 | 10/2015 | Davies et al. | |
| 2015/0345368 A1 | 12/2015 | Le Poul et al. | |
| 2016/0272039 A1* | 9/2016 | Cheng | H01M 10/663 |
| 2017/0167355 A1* | 6/2017 | Kim | F01P 3/20 |

FOREIGN PATENT DOCUMENTS

| | | |
|---|---|---|
| DE | 102015111407 A1 | 1/2017 |
| DE | 102016119181 A1 | 4/2018 |
| EP | 1832730 A2 | 9/2007 |
| GB | 665526 A | 1/1952 |
| JP | H10266856 A | 10/1998 |
| JP | 2012145004 A | 8/2012 |
| WO | 03042516 A2 | 5/2003 |
| WO | 2005040574 A1 | 5/2005 |
| WO | 2008080872 A1 | 7/2008 |
| WO | 2010059106 A1 | 5/2010 |
| WO | 2011050892 A1 | 5/2011 |
| WO | 2015080659 A1 | 6/2015 |
| WO | 2017081407 A1 | 5/2017 |

OTHER PUBLICATIONS

Scania CV AB, International Application No. PCT/SE2018/050387, International Search Report, dated Nov. 27, 2018.
Scania CV AB, International Application No. PCT/SE2018/050387, Written Opinion, dated Nov. 27, 2018.
Scania CV AB, European Application No. 18915115.2, Extended European Search Report, dated Aug. 12, 2021.

* cited by examiner

COOLING SYSTEM COMPRISING AT LEAST TWO COOLING CIRCUITS CONNECTED TO A COMMON EXPANSION TANK

CROSS-REFERENCE TO RELATED APPLICATIONS

This application is a National Stage Application (filed under 35 § U.S.C. 371) of PCT/SE2018/050387, filed Apr. 17, 2018 of the same title; the contents of which are hereby incorporated by reference.

FIELD OF THE INVENTION

The present invention relates to a cooling system comprising at least two cooling circuits. The present invention relates further to a vehicle comprising such a cooling system.

BACKGROUND OF THE INVENTION

Hybrid vehicles may be powered by an electric power unit in combination with some other form of power unit such as a combustion engine. The electric power unit may comprise an electrical machine which alternately works as motor and generator, an electrical energy storage for storing of electrical energy and power electronics for controlling the flow of electrical energy between the electrical energy storage and the electrical machine. The electrical machine, the electrical energy storage and the power electronics are heated during operation and they need to be cooled by coolant at different temperatures compared to the combustion engine in case of hybrid vehicle.

The electrical energy storage may have an optimal efficient operating temperature within the temperature range of 20-25° C. Thus, the electrical energy storage has to be cooled by coolant of a relatively low temperature. During certain operating condition when the ambient temperature is low, the electrical energy storage has to be heated. The electrical energy storage has a high thermal mass. Thus, the temperature of the electrical energy storage is changed relatively slowly when the load on the electrical energy storage is varied. The power electronics and the electrical machine can usually withstand a higher temperature which may be up to about 60-70° C. Thus, it is suitable to cool the power electronics and the electrical machine by coolant of a higher temperature and in a separate cooling circuit. The electrical machine has a low thermal mass and it can be highly loaded during certain operating conditions. In order to secure that the electrical machine will not be overheating, the cooling circuit cooling the electrical machine has to have a high cooling capacity.

However, vehicles may comprise other object to be cooled by coolant of different temperatures. Such objects may be a combustion engine, a hydraulic retarder, charge air, recirculating exhaust gases, engine oil, gearbox oil etc.

WO 2011/050892 shows a hybrid vehicle provided with a second cooling circuit for cooling of an electric drive unit and a first cooling circuit for cooling of an intercooler. The cooling system comprises a common expansion tank receiving coolants from the two cooling circuits.

SUMMARY OF THE INVENTION

The object of the present invention is to provide a cooling system comprising at least two cooling circuits designed to cool objects to different temperatures and which has a smaller size than two separate cooling circuits of the same cooling capacity and a vehicle comprising such a cooling system.

The above mentioned object is achieved by the cooling system according to the claims. The cooling system comprises a first cooling circuit connected to an expansion tank via a first deaeration line and a second cooling circuit connected to the expansion tank via a second deaeration line. Thus, the two cooling circuits are connected to a common expansion tank. Such a design reduces the number of including components and service points of the cooling system. The cooling system comprises further a deaeration valve by which it is possible to control the flow through the first deaeration line, a single outlet line directing all coolant in the expansion tank to the second cooling circuit and a connection line directing coolant from the second cooling circuit to the first cooling circuit. The cooling system may comprise more than two circuits which are connected to a common expansion tank. Such an additional circuit may be designed as the first circuit. In this case, the additional circuit comprises a deaeration line and a deaeration valve controlling the flow from the circuit to the expansion tank, and a connection line by which the additional circuit receives coolant from the second circuit.

During operating conditions when the deaeration valve is in a closed position, no coolant leaves the first cooling circuit via the first deaeration line. Since no coolant leaves the first cooling circuit, there is not possible to supply coolant to the first cooling circuit. Thus, there is no coolant exchange between the first cooling circuit and the second cooling circuit when the deaeration valve is in the closed position. In this case, the first cooling circuit and the second cooling circuit operate individually of each other. During operating conditions when the deaeration valve is in an open position, there is a coolant flow from the first cooling circuit, via the first deaeration line, to the expansion tank. The coolant flow from the first cooling circuit is mixed with the existing coolant in the expansion tank. All coolant in the expansion tank is directed to the second cooling circuit via the single outlet line. Thus, the coolant leaving the first cooling circuit is directed, via the expansion tank, to the second cooling circuit. The supply of cooled coolant from the first cooling circuit to the second cooling circuit results in a corresponding warm coolant flow from the second cooling circuit, via the connection line, to the first cooling circuit. Consequently, there is a coolant exchange between the first cooling circuit and the second cooling circuit when the deaeration valve is in an open position. Such a coolant exchange makes it possible to increase the cooling capacity of the cooling circuit having the higher temperature temporarily. In view of this fact, it is possible to design the cooling circuit having the higher coolant temperature with a lower cooling capacity and with a smaller radiator. Furthermore, the coolant exchange makes it possible to increase the temperature of the coolant in the cooling circuit having the lower temperature by means of coolant from the cooling circuit having the higher temperature. This measure makes it possible to heat an object in the cooling with the lower coolant temperature when it has a too low temperature.

According to an embodiment of the invention, the first cooling circuit is configured to cool a first object having a higher thermal mass than the second object and that the first cooling circuit is configured to cool the first object to a lower temperature than the second object. In case the second object has a too high temperature, the deaeration valve in the first deaeration line is set in an open position. This results in a coolant exchange between the first cooling circuit and the second cooling circuit and a reduced coolant temperature in the second cooling circuit and an elevated coolant temperature in the first cooling circuit. The reduced coolant temperature in the second cooling circuit increases the cooling capacity of the second cooling circuit and the possibility to cool the second object to a lower temperature. Since the first object has a high thermal mass, a temporarily coolant flow of an elevated temperature in the first cooling circuit will only increase the temperature of the first object slowly. Thus, it is possible to temporarily provide a decreased cooling capacity of the first cooling circuit without risking overheating of the first object.

According to a further embodiment of the invention, the first cooling circuit is configured to cool an electrical energy storage. Electrical energy storage has a high thermal mass and they have an optimal efficient at a relatively low temperature.

The second cooling circuit may be configured to cool an electrical machine and or power electronics. Electrical machines have a low thermal mass. Thus, the temperature of electrical machines rises rapidly when they are highly loaded. Thus, they need to be temporarily cooled with a high capacity. The present cooling system is able to provide a temporarily cooling with a high capacity when the deaeration valve is set in an open position. Electrical machines and power electronics should not be heated to a temperature above about 60-70° C.

According to a further embodiment of the invention, the expansion tank outlet line is configured to direct coolant from the expansion tank to a position in the second cooling circuit located downstream of the second radiator and upstream of the second coolant pump. Thus, the expansion tank outlet line directs coolant to the suction side of the second coolant pump. The coolant from the expansion tank outlet line is mixed with coolant in the second cooling circuit after the coolant in the second cooling circuit has been cooled in the second radiator.

According to a further embodiment of the invention, the connection line is configured to receive coolant from a position in the second cooling circuit located downstream of the second radiator. Thus, the connection line directs coolant from the second circuit after it has been cooled in the second radiator. Consequently, the connection line directs coolant of a relatively low temperature from the second cooling circuit to the first cooling circuit.

According to a further embodiment of the invention, the expansion tank outlet line is configured to direct coolant to a position in the second circuit which is located downstream of the position where coolant leaves the second cooling circuit via the connection line. Such a design secures that all coolant entering the second circuit from the expansion tank has to circulate almost a full lap in the second circuit before it can leave the second circuit via the connection line.

According to a further embodiment of the invention, the connection line is configured to direct coolant to a position in the first cooling circuit located downstream of the first radiator and upstream of the first coolant pump. Thus, the connection line directs coolant to the suction side of the first coolant pump. The coolant from the connection line is mixed with cooled coolant in the first cooling circuit leaving the first radiator.

According to a further embodiment of the invention, the first deaeration line is configured to receive coolant from the first cooling circuit in a position located downstream of the first coolant pump and upstream of the first object. Thus, the first deaeration line receives coolant from the pressure side of the first coolant pump.

According to a further embodiment of the invention, the second deaeration line is configured to receive coolant from the second cooling circuit in a position located downstream of the second coolant pump and upstream of the second object. Thus, the second deaeration line receives coolant from the pressure side of the second coolant pump.

According to a further embodiment of the invention, the deaeration valve is setable in at least one open position in which it allows a flow through the first deaeration line and in a closed position in which it prevent a flow through the first deaeration line. The deaeration valve will be a simple valve settable in two positions. Alternatively, the deaeration valve may settable in a plurality of different open positions in which it allows flows of different magnitudes through the first deaeration line. It is also possible to arrange a deaeration valve in the second deaeration line. In such a case, it is possible to control the flow through both deaeration lines.

According to a further embodiment of the invention, the cooling system comprises a control unit configured to control the deaeration valve. The control unit is configured to control the deaeration valve by means of information about a parameter related to the temperature of the first object and the second object. The control unit may, for example, receive information from temperature sensors sensing the temperature of the coolant leaving the first object and the second object.

According to a further embodiment of the invention the control unit is configured to set the deaeration valve in the open position when the second object has a too high temperature or and/or when the first object has a too low temperature. Due to the fact that the coolant in first circuit has a lower temperature than the coolant in the second circuit, it is possible to open the deaeration valve and supply cooled coolant from the first circuit to the second circuit and provide an increased cooling of the second object during operating conditions when the second object has a too high temperature. On the other hand, it is also possible to open the deaeration valve and supply warm coolant from the second circuit to the first circuit when the first object has a too low temperature.

The invention also relates to a vehicle comprising such a cooling system as described above.

BRIEF DESCRIPTION OF THE DRAWINGS

In the following a preferred embodiment of the invention is described, as an example, and with reference to the attached drawings, in which.

DETAILED DESCRIPTION OF THE INVENTION

Figure 1:
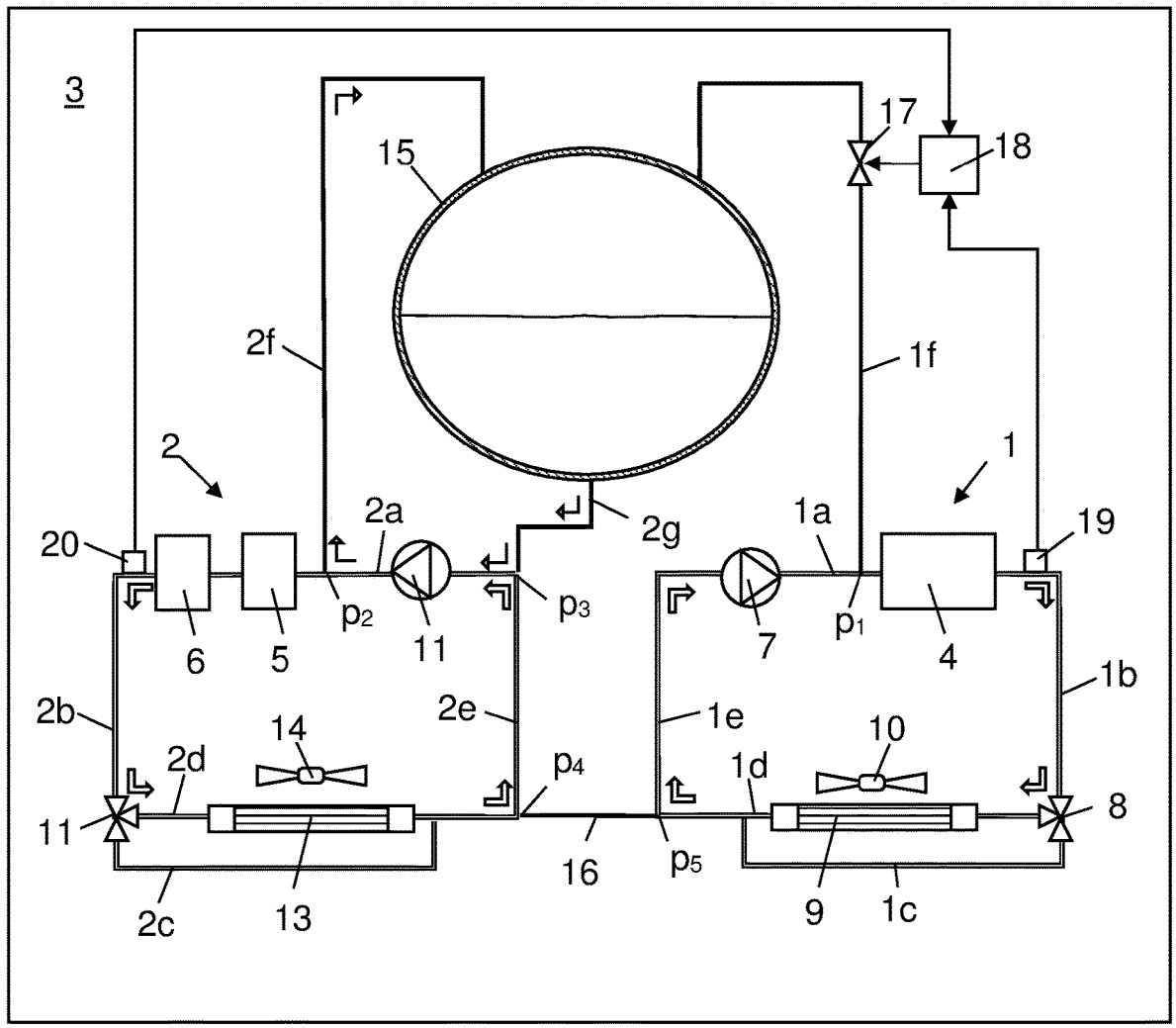
FIG. 1 shows a cooling system according to the invention in a first operating condition.

FIG. 1 shows a cooling system comprising a first cooling circuit 1 and a second cooling circuit 2. The cooling system is arranged in a schematically indicated vehicle 3. The vehicle 3 may be a hybrid vehicle or a pure electric vehicle. The first cooling circuit 1 is designed to cool e.g. an electrical energy storage 4. The electrical energy storage 4 has an optimal efficient within a specific temperature range ΔT which may be 20-25° C. The electrical energy storage 4 has a high thermal mass. Thus, the temperature of the electrical energy storage 4 is changed relatively slowly even when the load on the electrical energy storage 4 is varied rapidly. The second cooling circuit 2 is designed to cool e.g. an electrical machine 5 and power electronics 6. The electrical machine 5 and the power electronics 6 has an acceptable maximum acceptable temperature $T_{max}$ of about 60-70° C. The electrical machine 5 and the power electronics have a low thermal mass. Thus, the temperature of the electrical machine 5 and the power electronics 6 can increase rapidly when they are highly loaded. Due to the different cooling demands, the electrical energy storage 4 has to be cooled by coolant in the first cooling circuit 1 with a significantly lower temperature than the coolant in the second cooling circuit 2 which cools the electrical machine 5 and the power electronics 6.

A first coolant pump first coolant pump 7 circulates coolant in the first cooling circuit 1. A first coolant pump outlet line 1a receives coolant from the first coolant pump 7 and directs it to the electrical energy storage 4. The coolant leaving the electrical energy storage 4 is directed, via an energy storage outlet line 1b, to a first three way valve 8. The first three way valve 8 may be a thermostat. In case the coolant has a lower temperature than a regulating temperature of the first three way valve 8, the coolant is directed to a first radiator bypass line 1c and past a first radiator 9. On the other hand, in case the coolant has a higher temperature than said regulating temperature, the first three way valve 8 directs the coolant to a radiator line 1c and the first radiator 9. A first radiator fan 10 provides an air stream through the first radiator 9. A first coolant pump inlet line 1e receives coolant from the bypass line 1c and/or the radiator line 1d and directs it back to the first coolant pump 7.

A second coolant pump 11 circulates coolant in the second cooling circuit 2. The second coolant pump 11 directs coolant to a second coolant pump outlet line 2a. The second coolant pump outlet line 2a directs coolant to the electrical machine 5 and the power electronics 6. The coolant leaving the electrical machine 5 and the power electronics 6 is directed, via a power electronics outlet line 2b, to a second three way valve 11. The second three way valve 11 may be a thermostat. In case the coolant has a lower temperature than a regulating temperature of the second three way valve 11, the coolant is directs to a second radiator bypass line 2c and past a second radiator 13. On the other hand, in case the coolant has a higher temperature than said regulating temperature, the second three way valve 11 directs the coolant to a radiator line 2d and the second radiator 13. A second radiator fan 14 provides an air stream through the second radiator 13. A second coolant pump inlet line 2e receives coolant from the second radiator bypass line 2c and/or the radiator line 2d and directs it back to the second coolant pump 11.

The first cooling circuit 1 and the second cooling circuit 2 are connected to a common expansion tank 15. The first cooling circuit 1 comprises a first deaeration line 1f connecting the first coolant pump outlet line 1a to the expansion tank 15. The first deaeration line 1f receives coolant from the first cooling circuit 1 in a position $p_1$ located downstream of the first coolant pump 7 and upstream of the electrical energy storage 4. The second cooling circuit 2 comprises a second deaeration line 2f connecting the second coolant pump outlet line 2a to the expansion tank 15. The second deaeration line 2f receives coolant from the second cooling circuit 2 in a position $p_2$ located downstream of the second coolant pump 11 and upstream of the electrical machine 5 and the power electronics 6. The expansion tank 15 comprises a single expansion tank outlet line 2g. The expansion tank outlet line 2g directs coolant to a position $p_3$ in the second coolant pump inlet line 2e.

The first deaeration line 1f comprises a deaeration valve 17. The deaeration valve 17 is controlled by a control unit 18. The control unit 18 may also control the three way valves 8, 11 in case they are not wax thermostats or otherwise controlled. The control unit 18 controls the deaeration valve 17 in view of information from a first temperature sensor 19 sensing the coolant temperature in the first cooling circuit 1 in a downstream position of the electrical energy storage 4 and a second temperature sensor 20 sensing the coolant temperature in the second cooling circuit 2 in a downstream position of the electrical machine 5 and the power electronics 6. Thus, the first temperature sensor 19 senses a temperature related to the temperature of the energy storage 4 and the second temperature sensor 20 senses a temperature related to the temperature of the electrical machine 5 and the power electronics 6. Alternatively, said temperature sensors 19, 20 may be internal sensors which direct senses the temperature of said components 4, 5, 6. The cooling system comprises a connection line 16 which is arranged between the second coolant pump inlet line 2e and the first coolant pump inlet line 1e. The connection line 16 receives coolant in a position $p_4$ in the second coolant pump inlet line 2e and directs it to a position $p_5$ in the first coolant pump inlet line 1e.

The deaeration valve 17 is set in an open position before start of the cooling system and the coolant pumps 7, 11. During an initial operation time, air bubbles are usually present in the coolant flowing through the first cooling circuit 1 and the second cooling circuit 2. The coolant with the air bubbles are directed, via the deaeration lines 1f, 2f, from the respective cooling circuits 1, 2, to the expansion tank 15. After a period of continued operation, substantially only coolant is directed, via the deaeration lines 1f, 2f, to the expansion tank 15. During a following regular operating phase, the control unit 18 receives information from the first temperature sensor 19 about the temperature of the coolant in the first cooling circuit 1 and from the second temperature sensor 20 about the temperature of the coolant in the second cooling circuit 2. The control unit 18 determines if the temperature of the coolant in the first cooling circuit 1 is within the optimal temperature range ΔT and if the temperature of the coolant in the second cooling circuit 2 is lower than the maximum acceptable temperature $T_{max}$. In case the control unit 18 receives information indicating that the temperature of the coolant in the first cooling circuit 1 is within the optimal temperature range ΔT and the temperature of the coolant in the second cooling circuit 2 is lower than the maximum acceptable temperature $T_{max}$, the control unit sets the deaeration valve 17 in a closed position FIG. 1 shows the cooling system when the deaeration valve 17 is in the closed position. In this case, the deaeration valve 17 blocks the flow in first deaeration line 1f such that no coolant leaves the first cooling circuit 1 via the first deaeration line 1f. Since no coolant leaves the first cooling circuit 1, no coolant can be supplied to the first cooling circuit 1 via the connection line 16. Thus, the coolant circulates in a closed loop in the first cooling circuit 1. The closed loop includes the first coolant pump 7, the first coolant pump outlet line 1a, the electrical energy storage 4, the energy storage outlet line 1b, the three way valve 8, the radiator bypass line 1c or the first radiator line 1d, and the first coolant pump inlet line 1e. At the same time, the coolant circulates in the second cooling circuit 2. The coolant in the second circuit 2 circulates in a main loop including the second coolant pump 11, the second coolant pump outlet line 2a, the electrical machine 5, the power electronics 6, the power electronic outlet line 2b, the second three way valve 11, the second radiator bypass line 2c or the second radiator line 2d and the second coolant pump inlet line 2e. The coolant in the second cooling circuit circulates also in a sub loop including the second coolant pump 11, a part of the second coolant pump outlet line 2a, the second deaeration line 2f, the expansion tank 15, the expansion tank outlet line 2g and a part of the second coolant pump inlet line 2e. In this case, the second cooling circuit 2 provides the entire coolant flow to and from the expansion tank 15. There is no mixture of coolant between the first cooling circuit 1 and the second cooling circuit 2. Thus the first cooling circuit 1 and the second cooling circuit 2 operate as two separate cooling circuit when the deaeration valve 17 is in the closed position.

Figure 2:
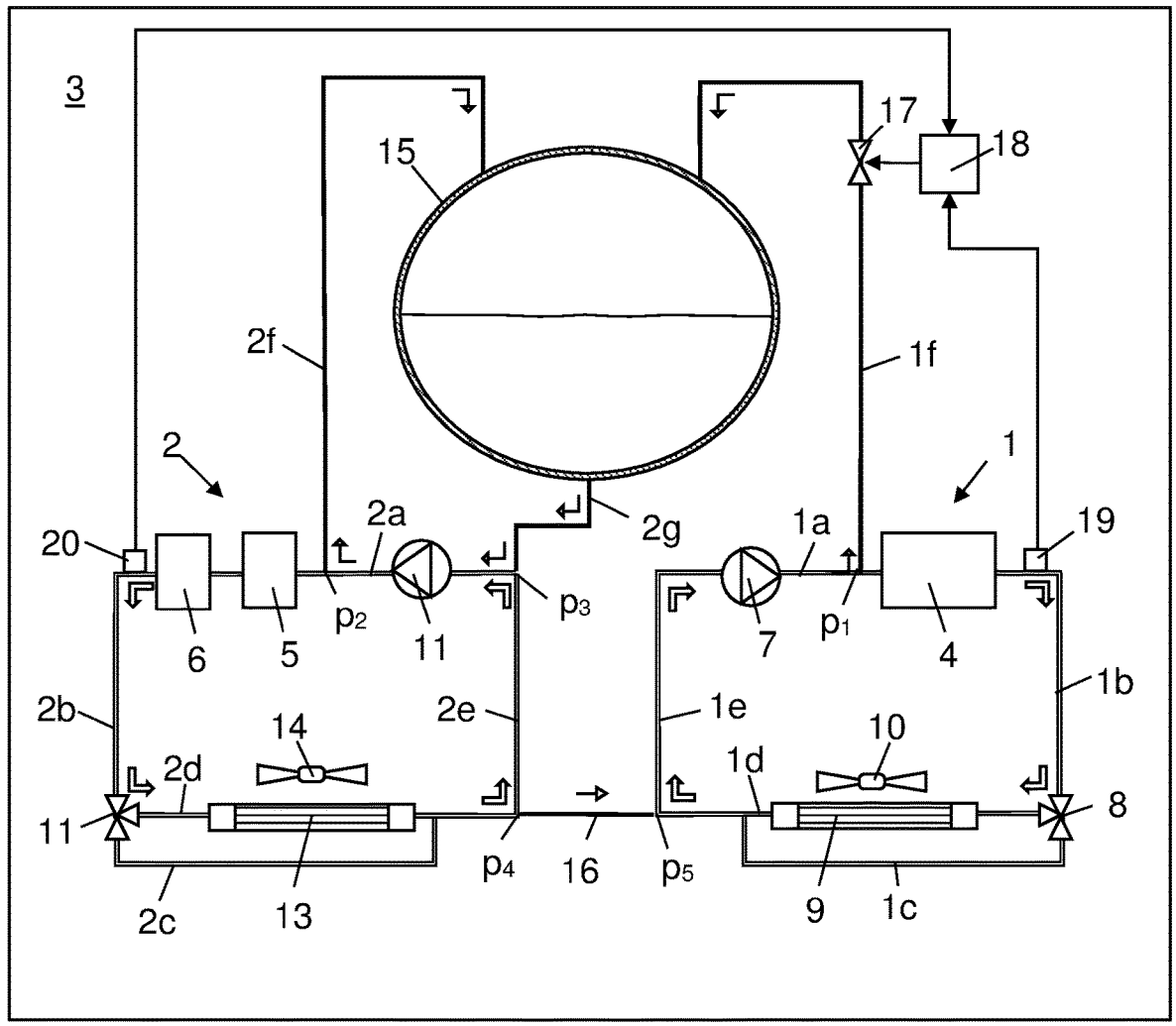
FIG. 2 shows the cooling system in FIG. 1 in a second operating condition and FIG. 3 shows an alternative cooling system.

In case the control unit 18 receives information indicating that the coolant temperature in the second cooling circuit 2 is higher than the maximum acceptable temperature $T_{max}$ and the coolant temperature in the first cooling circuit 1 is within the optimal temperature range $\Delta T$, the control unit 18 sets the deaeration valve 17 in an open position. FIG. 2 shows the cooling system when the deaeration valve 17 is in the open position. In this case, the deaeration valve 17 allows a flow through the first deaeration line 1f. Thus, coolant leaves the first cooling circuit 1 via the first deaeration line 1f and enters the expansion tank 15. Due to the fact that the coolant temperature in the first cooling circuit 1 is lower than in the second cooling circuit 2, the temperature of the coolant in the expansion tank 15 drops and coolant of a lower temperature is directed from the expansion tank 15 to the second cooling circuit 2.

The expansion tank outlet line 2g directs coolant from the expansion tank 15 to the position $p_3$ of the second coolant pump inlet line 2e where it is mixed with coolant circulating in the second cooling circuit 2. The second coolant pump 11 directs the mixed coolant, which has a somewhat lower temperature than the coolant leaving the second radiator 13, to the electrical machine 5 and the power electronics 6. The supply of cooled coolant from the expansion tank 15 increases the cooling capacity of the second cooling circuit 2 which makes it possible to cool the electrical machine 5 and the power electronics 6 to a lower temperature. The coolant leaving the first cooling circuit 1, via the first deaeration line 1f, is replaced by coolant directed from the second cooling circuit 2 to the first cooling circuit 1 via the connection line 16.

Since the coolant in the second cooling circuit 2 has a higher temperature than the coolant in the first cooling circuit 1, the coolant temperature in the first cooling circuit 1 increases. In view of the fact that the electrical energy storage 4 has a high thermal mass, a temporarily coolant flow of a higher temperature to the electrical energy storage 4 will only slowly increase the temperature of the electrical energy storage 4. Thus, it is possible to temporarily provide an increased cooling of the electrical machine 5 in the second cooling circuit by means of coolant from the first cooling circuit without risking overheating of the electrical energy storage 4. The deaeration valve 17 is maintained in the open position until the control unit 18 receives information from the second temperature sensor 20 indicating that the coolant leaving the electrical machine 5 and the power electronics 6 has a lower temperature than the maximum acceptable temperature $T_{max}$. Alternatively, the deaeration valve 17 is moved from the open position to the closed position if the control unit 18 receives information from the first temperature sensor 19 indicating that the electrical energy storage 4 has been heated to a higher temperature than the highest temperature in said optimal temperature range $\Delta T$.

In case the temperature of the electrical energy storage 4 is lower than a lowest temperature in the optimal temperature range. The control unit 18 also sets the deaeration valve 17 in the open position. Thus, cooled coolant leaves the first cooling circuit 1 via the first deaeration line 1f and warm coolant enters the first cooling circuit 1 via the connection line 16. When the coolant in the first cooling circuit obtains a higher temperature than the electrical energy storage 4, it is possible to heat the electrical energy storage 4. The control unit 18 maintains the deaeration valve 17 in the open position until the first temperature sensor 19 indicates that the electrical energy storage 4a has a temperature within said optimal temperature range $\Delta T$.

Consequently, the deaeration valve 17 is set in the closed position when the first cooling circuit 1 provides a desired cooling of the electrical energy storage 4 and the second cooling circuit provides a desired cooling of the electrical machine 5 and the power electronics 6. In this case, the cooling circuits 1, 2 operate independently of each other and there is no coolant flow between the cooling circuits 1, 2. The deaeration valve 17 is set in the open position when the second cooling circuit 2 is not able to provide a desired cooling of the electrical machine 5 and the power electronics 6 or when the electrical energy storage 4 has a too low temperature. In this case, there is an exchange of coolant between the cooling circuits 1, 2 which results in a lower coolant temperature in the second cooling circuit 2 and a higher coolant temperature in the first cooling circuit 1. A lower coolant temperature in the second cooling circuit 2 makes it possible to increases the cooling capacity of the second cooling circuit and the possibility to cool the electrical machine 5 and the power electronics 6 to a lower temperature than the maximum acceptable temperature $T_{max}$. A higher coolant temperature in the first cooling circuit 1 makes it possible to heat the electrical energy storage 4a to a temperature within said optimal temperature range $\Delta T$ when it has a too low temperature.

Figure 3:
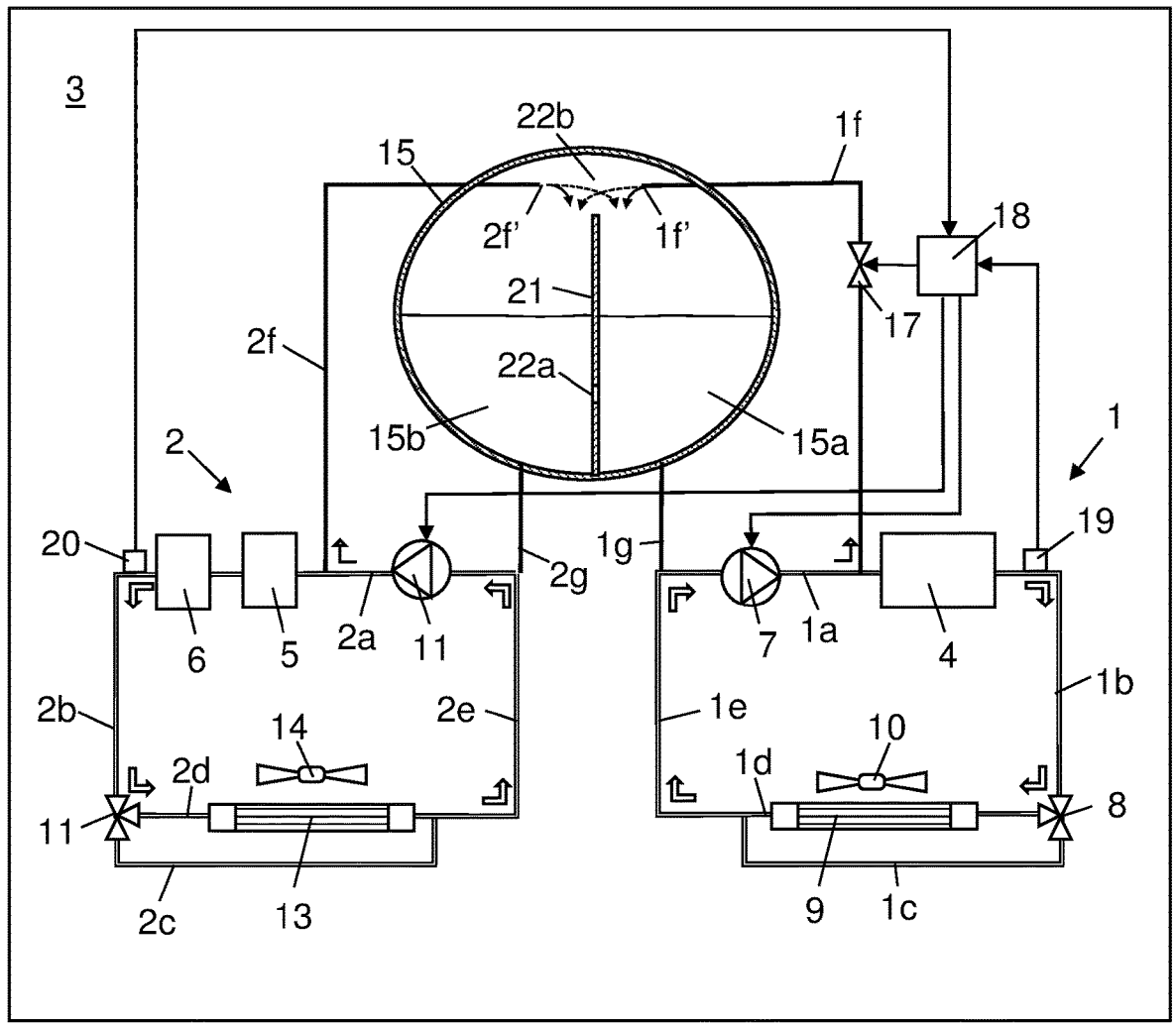

FIG. 3 shows an alternative cooling system comprising a first cooling circuit 1 and a second coolant circuit 2. The coolant in the first cooling circuit 1 is designed to have a lower temperature than the coolant in the second cooling circuit 2. In this case, the first cooling circuit 1 comprises a first expansion tank outlet line 1g and the second cooling circuit 2 comprises a second expansion tank outlet line 2g. Furthermore, the expansion tank 15 comprises a wall element 21 dividing an inner space of the expansion tank 15 in a first chamber 15a and a second chamber 15b. The wall element 21 comprises an orifice defining a coolant passage 22a between the chambers 15a, 15b. The coolant passage 22a is located at a lower level than a minimum coolant level in the expansion tank 15. The coolant passage 22a allowing a coolant flow through the wall element 21 which evens out coolant level differences between the first chamber 15a and the second chamber 15b. An air passage 22b is arranged in the expansion tank 15 in a position above an upper edge of the wall element 21. The air passage 22b is located at a higher level than a maximum coolant level in the expansion tank 15. The air passage 22b allowing an air flow between the first chamber 15a and the second chamber 15b which evens out pressure differences between the chambers 15a, 15b.

The first cooling circuit 1 comprises a first deaeration line 1f having a horizontal end portion comprising a first outlet opening 1f. The first outlet opening 1f' is positioned vertically 6 above the coolant in the first chamber 15a and at a higher level than the upper edge of the wall element 21. The second cooling circuit 2 comprises a second deaeration line 2f having a horizontal end portion comprising a second outlet opening 2f'. The second outlet opening 2f' is positioned vertically 6 above the coolant in the second chamber 15b and at a higher level than the upper edge of the wall element 21. In case the coolant flow rate in the first deaeration line 1f is low, it has a low horizontal speed component when it leaves the first outlet opening 1f'. Thus, the coolant falls substantially straight downwards from the first deaeration opening 1f' to the coolant in the first chamber 15a. In a corresponding manner, in case the coolant flow rate in the second deaeration line 2f is low, it has a low horizontal speed component when it leaves the second outlet opening 2f'. Thus, the coolant falls substantially straight downwards from the second deaeration outlet opening 2f' to the coolant in the second chamber 15b. On the other hand, in case the flow rate in the first deaeration line 1f is high, the coolant leaving the first deaeration outlet opening 1f' has a high horizontal speed component and the coolant flows over the wall element 21 whereupon it is mixed with the warmer coolant in the second chamber 15b. In a corresponding manner, in case the flow rate in the second deaeration line 1f is high, the coolant leaving the second deaeration line opening 2f' has a high horizontal speed component and the coolant flows over the wall element 21 whereupon it is mixed with the cooler coolant in the first chamber 15a.

Consequently, the exchange of coolant between the first cooling circuit and the second cooling circuit 2 can be controlled by a first coolant pump 7 and a second deaeration line 2f which define the coolant flow rate in the respective cooling circuits 1, 2. It is also possible to control the coolant flow rate through the first deaeration line 1f by means of a deaeration valve 17. A control unit 18 controls the coolant pumps 7, 11 and the deaeration valve 17. During operating condition when the temperature of the electrical energy storage 4 is within the optimal temperature range ΔT and the temperature of the electric machine 5 and the power electronics is lower than the maximum acceptable temperature $T_{max}$, the control unit 18 controls the coolant pumps 7, 11 such that they provide a low coolant flow rates in the first coolant circuit 1 and the second coolant circuit 2. In this case, the coolant leaving the first deaeration line 1f is collected in the first chamber 15a and directed back to the first cooling circuit 1 via the first expansion tank outlet line 1g. The coolant leaving the second deaeration line 2f is collected in the second chamber 15b and directed back to the second cooling circuit 2 via the second expansion tank outlet line 2g. In this case, there is substantially no exchange of coolant between the cooling circuits 1, 2.

During operating condition when the temperature of the electric machine 5 and the power electronics 6 is too high temperature or the temperature of the electrical energy storage 4 is too low temperature, the control unit 18 controls the coolant pumps 7, 11 such that a high coolant flow rate is provided in the first coolant circuit 1 and the second coolant circuit 2. In this case, the coolant leaving the first deaeration line 1f is mixed warmer coolant in the second chamber 15b and directed to the second cooling circuit 2 via the second expansion tank outlet line 1g. The coolant leaving the second deaeration line 2f is mixed with cooler coolant in the first chamber 15a and directed to the first cooling circuit 1 via the first expansion tank outlet line 1g. In this case, there is an abundant exchange of coolant between the cooling circuits 1, 2. Such an exchange of coolant of different temperatures between the first cooling circuit and the second cooling circuit 2 results in that the electric machine 5 and the power electronics 6 is cooled by coolant of a lower temperature. Furthermore, coolant of a higher temperature is directed to the electrical energy storage 4. This makes it possible to heat the electrical energy storage 4 during operating conditions when it has a too low temperature. During certain operating conditions, it can be favorable to have a less abundant exchange of coolant between the cooling circuits 1, 2. In such a case, the control unit 18 controls the coolant pumps 7, 11 and or the deaeration valve 17 such that one of the deaeration lines 1f, 2f obtains a high coolant flow and the other deaeration line 1f, 2f a low coolant flow rate.

The invention is not restricted to the embodiment described in FIGS. 1 and 2 but may be varied freely within the scope of the claims. More circuits may be added to the already described two circuits 1, 2. Such further circuits may have a corresponding design as the first circuit 1. An arbitrary number of first circuits 1 may be arranged in parallel. Each such additional first cooling circuit 1 may be provided with a deaeration line 1f and a deaeration valve 17 by which it is possible to control the flow from the respective first cooling circuits 1 to the common expansion tank 15. All first cooling circuit 1 may receive coolant from the second circuit via a respective connection line 16.

The invention claimed is:

1. A cooling system comprising:
a first cooling circuit configured to cool a first object;
a first coolant pump configured to circulate coolant in the first cooling circuit;
a first radiator;
a second cooling circuit configured to cool a second object;
a second coolant pump configured to circulate coolant in the second cooling circuit;
a second radiator;
an expansion tank;
a first deaeration line configured to direct coolant and air from the first cooling circuit to the expansion tank;
a second deaeration line configured to direct coolant and air from the second cooling circuit to the expansion tank;
a deaeration valve configured to control the flow through the first deaeration line;
a single expansion tank outlet line configured to direct all coolant in the expansion tank to the second cooling circuit;
a connection line configured to direct coolant from the second cooling circuit to the first cooling circuit; and
a control unit configured to control the deaeration valve, wherein the first object has a different thermal mass than a thermal mass of the second object, wherein the control unit controls opening and closing of the deaeration valve to allow coolant exchange between the first cooling circuit and the second cooling circuit based on the difference in thermal mass between the first and second object.

2. A cooling system according to claim 1, wherein the first object has a higher thermal mass than a thermal mass of the second object, wherein the first cooling circuit is configured to cool the first object having the higher thermal mass to a lower temperature than the second object.

3. A cooling system according to claim 1, wherein the first cooling circuit is configured to cool an electrical energy storage.

4. A cooling system according to claim 1, wherein the second cooling circuit is configured to cool an electrical machine.

5. A cooling system according to claim 1, wherein the expansion tank outlet line is configured to direct coolant from the expansion tank to a position $P_3$ in the second circuit which is located downstream of the second radiator and upstream of the second coolant pump.

6. A cooling system according to claim 1, wherein the connection line is configured to receive coolant from a position $P_4$ in the second cooling circuit located downstream of the second radiator and upstream of the second coolant pump.

7. A cooling system according to claim 6, wherein the expansion tank outlet line is configured to direct coolant to a position $P_3$ in the second circuit which is located downstream of the position $P_4$ where coolant leaves the second cooling circuit via the connection line.

8. A cooling system according to claim 1, wherein the connection line is configured to direct coolant to a position $P_5$ in the first cooling circuit located downstream of the first radiator and upstream of the first coolant pump.

9. A cooling system according to claim 1, wherein the first deaeration line is configured to receive coolant from the first cooling circuit in a position $P_1$ located downstream of the first coolant pump and upstream of the first object.

10. A cooling system according to claim 1, wherein the second deaeration line is configured to receive coolant from the second cooling circuit in a position $P_2$ located downstream of the second coolant pump and upstream of the second object.

11. A cooling system according to claim 1, wherein the deaeration valve is setable in at least one open position in which it allows a flow through the first deaeration line and in a closed position in which it prevent a flow through the first deaeration line.

12. A cooling system according to claim 1, wherein the control unit is configured to control the deaeration valve by means of information about the temperature of the first object and the second object.

13. A cooling system according to claim 12, wherein the control unit is configured to set the deaeration valve in the open position when the second object has a too high temperature or and/or when the first object has a too low temperature.

14. A vehicle comprising a cooling system comprising:
a first cooling circuit configured to cool a first object;
a first coolant pump configured to circulate coolant in the first cooling circuit;
a first radiator;
a second cooling circuit configured to cool a second object;
a second coolant pump configured to circulate coolant in the second cooling circuit;
a second radiator;
an expansion tank;
a first deaeration line configured to direct coolant and air from the first cooling circuit to the expansion tank;
a second deaeration line configured to direct coolant and air from the second cooling circuit to the expansion tank;
a deaeration valve configured to control the flow through the first deaeration line;
a single expansion tank outlet line configured to direct all coolant in the expansion tank to the second cooling circuit;
a connection line configured to direct coolant from the second cooling circuit to the first cooling circuit; and
a control unit configured to control the deaeration valve, wherein the first object has a different thermal mass than a thermal mass of the second object, wherein the control unit controls opening and closing of the deaeration valve to allow coolant exchange between the first cooling circuit and the second cooling circuit based on the difference in thermal mass between the first and second object.

15. A cooling system according to claim 1, wherein the control unit is configured to control the deaeration valve to allow coolant exchange between the first cooling circuit and the second cooling circuit to thereby create a reduced coolant temperature in the second cooling circuit and an elevated coolant temperature in the first cooling circuit to thereby increase the cooling capacity of the second cooling circuit.

16. A cooling system according to claim 1, wherein the control unit is configured to control the deaeration valve, such that when a temperature coolant in the second cooling circuit is higher than a selected maximum temperature and a temperature of coolant in the first cooling circuit is within a selected optimal temperature range, the control unit opens the deaeration valve.

17. A cooling system according to claim 16, wherein the control unit closes the deaeration valve based upon determining one of: 1) the temperature of the coolant in the second cooling circuit is at a lower temperature than the selected maximum temperature; or 2) the temperature of the coolant in the first cooling circuit is at a higher temperature than a highest temperature in the selected optimal temperature range.

18. A cooling system according to claim 1, wherein the control unit is configured to control the deaeration valve, such that if a temperature of coolant in the first cooling circuit is lower than a lowest temperature of a selected optimal temperature range, said control unit opens the deaeration valve to allow coolant from the second cooling circuit to enter into the first cooling circuit to thereby heat the first cooling circuit.

* * * * *